Sept. 1, 1964 — L. M. DAVIS — 3,146,542
WOBBLE SPOON
Filed June 20, 1962
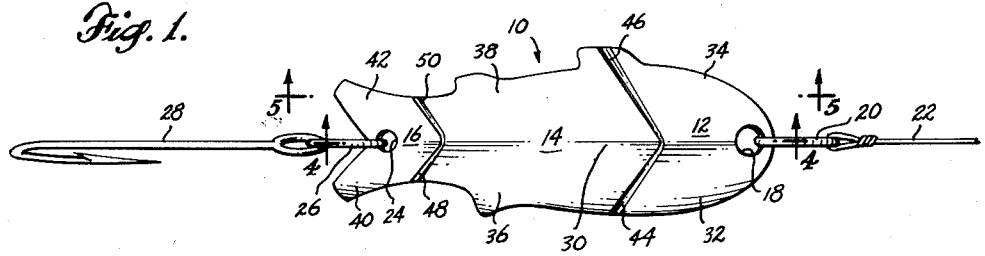
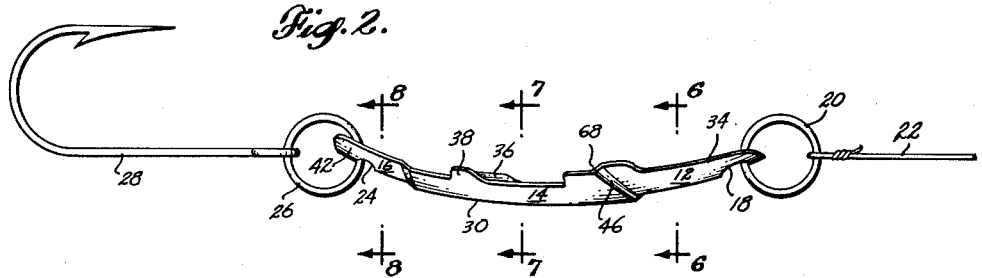
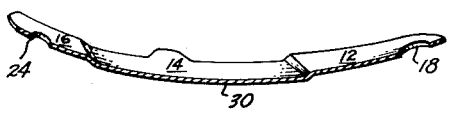
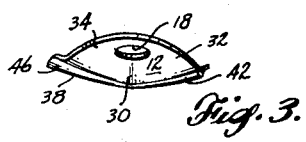
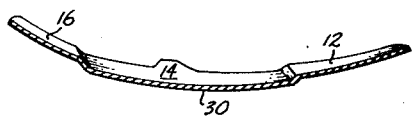
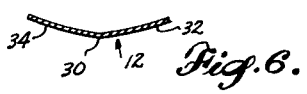
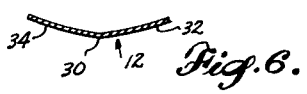
INVENTOR.
LESTER M. DAVIS
BY
Mathis and Graybeal
ATTORNEYS United States Patent Office 3,146,542
Patented Sept. 1, 1964

3,146,542
WOBBLE SPOON
Lester M. Davis, Tacoma, Wash., assignor to Les Davis Fishing Tackle Co., Tacoma, Wash., a corporation of Washington
Filed June 20, 1962, Ser. No. 203,971
6 Claims. (Cl. 43—42.5)

This invention relates to a fishing lure, and more particularly to the class of fishing lure commonly termed "spoon" or "wobbler" and being characterized, when pulled through the water, by a wobbling action, as distinguished from complete rotation, and also by a right and left darting movement. The principal object of this invention is to provide a new and improved fishing lure of this type.

The efficiency of a spoon in catching fish is largely dependent on its action in the water, and the action in the water is in turn dependent on the shape and configuration of the spoon. It is an object of this invention to provide a spoon having a novel shape and configuration giving it a more positive and faster action than that possessed by earlier designs.

Due to such novel shape and configuration the spoon of this invention darts back and forth sharply and has a quick and positive wobble motion when moving relative to the water at either fast or slow speed.

The spoon of this invention is in the nature of an improvement on such prior art spoons as those shown and described in Martin, U.S. Patent 1,846,130, March, U.S. Patent 2,053,954, Heiland, 2,588,720 and Round, U.S. Patent 2,624,147.

A further object is to provide a trolling spoon having a tail section configured to cause considerably more cavitation, i.e. a region of low pressure at the rear of the spoon than characteristic of earlier designs. The presence of this increased amount of cavitation adjacent the spoon tail section helps the darting action considerably and in addition causes the water to eddy or boil, producing a stream of "white water" breaking away from the tail of the spoon as the spoon moves through the water, the presence of "white water" making the spoon more attractive to fish.

A still further object is to provide a spoon type fish lure comprising a sheet metal stamping representing the outline of a fish and having a head section, a body section and a tail section, the configuration of the lure including a longitudinally extending, centrally arranged valley which is laterally offset at the points of junction of the head and tail sections to the body section, the lines of offset both being relatively abrupt and the body section being offset below the head and tail sections, the configuration also involving the sections having progressive transverse V-shaped configurations of which the longitudinally extending, centrally arranged valley forms the apex, such configuration varying from a relatively wide angled V in the head section, to a flatter extremely wide angled V in the body section, to a relatively sharp angled V in the tail section, and the head, body and tail sections of the spoon being slightly curved longitudinally with all of the aforementioned features cooperating to provide a spoon having improved action and constituting an attractive and tantalizing lure to all kinds of game fish when drawn through the water.

Other objects and advantages will be apparent from the following description, appended claims and annexed drawing.

Referring to the drawing wherein like reference characters designate like parts throughout the several views:

FIG. 1 is a plan view of the trolling spoon looking toward the inwardly curved side thereof, which in use is the top side, and showing its general configuration, the offset relationship of the several sections, the variance of offset of the surfaces from the valley to the edges, and a typical manner of fastening the spoon to a line and a hook to the spoon;

FIG. 2 is a side view showing the longitudinal curvature of the spoon, the lateral offset relationship of the central valley of the head and tail sections with respect to the central valley of the body section, and the varying degree of offset of the surfaces of the head and tail sections with respect to the surface of the body section;

FIG. 3 is a front view showing in detail the varying offset relationship of the surfaces of the head and body sections, wherein the offset is slight at the valley and increases as the surfaces move outwardly to the edges;

FIG. 4 is a longitudinal sectional view taken along line 4—4 of FIG. 1, and showing in detail the longitudinal contour of the valley and also showing a portion of the inwardly curved surface portion of the spoon;

FIG. 5 is a longitudinal sectional view taken along line 5—5 of FIG. 1, and showing the contour of the spoon surface at that line for comparison with the contour of the valley;

FIG. 6 is a transverse sectional view of the head section taken along line 6—6 of FIG. 2, and showing the relatively flat transverse V configuration of said head section;

FIG. 7 is a transverse sectional view of the body section taken along line 7—7 of FIG. 2, and showing the extremely flat transverse V configuration of the body section; and FIG. 8 is a transverse sectional view of the tail section taken along line 8—8 of FIG. 2, and showing the relatively sharp transverse V configuration of the tail section.

Referring now to FIG. 1, the spoon 10 of this invention comprises a sheet metal stamping representing the outline of a fish and having a head section 12, a body section 14 and a tail section 16. Head section 12 is apertured at 18 for the reception of a ring 20 permitting the connection of a line 22 to said head section, and an aperture 24 is formed in the tail section for the reception of a ring 26 onto which a hook 28 is secured in the usual manner. Of course, it is to be understood that the means employed for fastening spoon 10 onto line 22 and hook 28 onto spoon 10 do not form a part of the invention, and the arrangement shown and described is merely illustrative of one of many possible arrangements and is therefor non-limitive.

As most clearly shown in FIGS. 2, 4, and 5, spoon 10 is slightly curved or bowed in the longitudinal direction and is also curved in the transverse direction, as most clearly shown in FIGS. 3, 6, 7 and 8.

The body section 14 is laterally offset from the head section 12 and the tail section 16, each line of offset being relatively abrupt. That is, the sloped portions connecting the head section to the body section and the body section to the tail section are relatively steep. The transverse configuration of the three sections varies from a rather flat transverse curvature in the head section to an extremely flat transverse curvature in the body section 14 to a relatively sharp transverse curvature in the tail section 16. The transverse configuration of each of the sections is more V-shaped than arcuate with the apexes of said sections together defining a longitudinally extending, centrally located valley 30, such arrangement being clearly shown in FIGS. 1, 3, 6, 7 and 8.

The transverse configuration of head section 12 includes head faces 32, 34 disposed on opposite sides of the head portion of valley 30 and defining between them a relatively flat obtuse angle falling within a range of angles extending from 145° to 155°, inclusive (FIG. 6). The transverse configuration of body section 14 includes body halves 36, 38 disposed on opposite sides of the body portion of valley 30 and defining between them an extremely flat obtuse angle falling within the range of angles extending from 160° to 170°, inclusive (FIG. 7). The transverse configuration of tail section 16 includes tail side surfaces 40, 42 extending outwardly on opposite sides from the tail portion of valley 30 and defining between them a relatively sharp obtuse angle falling within the range of angles extending from 110° to 125°, inclusive (FIG. 8). It should be noted at this point that head faces 32, 34, body halves 36, 38 and tail side surfaces 40, 42 are not flat, but rather are slightly curved in transverse section.

As a result of the variance in transverse configuration of the several sections the amount of offset of the respective surfaces of such sections varies ranging from approximately one thickness of metal at the valley to approximately three thicknesses of metal at the edges for a spoon that is about one and one-quarter inches long. Of course, in the case of a larger spoon the offset at the valley might be approximately X times the thickness of the metal and the offset at the edges be approximately 3X times the thickness of the metal, the point being that the offset at the edges is approximately three times the offset at the valley 30.

The lines of offset are arranged on each side of valley 30 to be at an angle with respect to the valley 30 of somewhere within the range of 50° to 70°, with the line of offset in each case extending toward the rear of the spoon. The metal in the region of the offset is sharply creased along two lines forming a first transitional section possessing a pair of steeply angled surfaces 44, 46 connecting head section 12 to body section 14 and a second transitional section possessing a pair of steeply angled surfaces 48, 50 connecting body section 14 to tail section 16.

The longitudinal sectional configuration of lure 10, at substantially any location across the lure, essentially represents a first relatively flat arcuate curve in the body section 14 offset below and concentrically related to a second curve in the head section 12 and a third curve in the tail section 16. FIGS. 4 and 5 illustrate typical cross-sectional views of the lure 10.

It has been found by experimentation that a spoon configured in the manner described has more positive and faster action than that possessed by earlier designs and an attractive amount of "wobble" and "darting" action will be provided even at slow speed. The offsets create considerably more cavitation at the rear of the spoon than is produced by a spoon possessing no offsets. And, as is commonly known, the phenomena known as "cavitation" creates a region of relatively low pressure where the cavitation occurs, which in the case of the subject spoon is adjacent the tail section 16 on the outwardly curved side thereof. The presence of such relative low pressure region results in a pressure differential and such pressure differential is what produces the lateral forces acting on the spoon to give it its characteristic action. Therefore, the higher magnitude pressure differential produced by the novel configuration of the present spoon results in larger lateral forces and improved action. In addition, the water around the lower pressure area eddies into it, producing a stream of "white water" breaking away from the tail section of the spoon as the spoon moves through the water, and the presence of such "white water" makes the spoon more attractive to fish.

Another advantageous feature of the spoon configuration described above is that it has a large number of light-reflecting surfaces and while wobbling through the water will throw out highly modulated reflected light facets which are very tantalizing to game fish. To improve its light reflecting capability, the spoon should be constructed from bright nickel, shiny sheet brass, shiny sheet copper, stainless steel, coated plastic material or other good light-reflecting material.

It is proposed that a die be used in the manufacture of this spoon and that the forming of the central valley 30 and the offsets, the cutting of the fish shaped outline and the punching of the apertures 18 and 24 be all performed in a single stamping operation.

Spoons such as described may be made in many sizes and with a variation in outline but the principal features of longitudinal and transverse concavity, a longitudinally extending, centrally arranged valley and a body section laterally offset below head and tail sections as described, must be retained.

I claim:

1. A generally concavo-convex shaped fishing lure of the wobble spoon type, having a central body section, a forward head section, and a rearward tail section, said central body section being abruptly offset from both the head and tail sections, with the several sections having different lateral V-shaped configurations, varying from a relatively flat angled V in the head section, to a flatter angled V in the body section, to a relatively sharp angled V in the tail section, with the apexes of said sections together forming a valley line extending substantially the length of the lure, with line connection means provided in said head section, and with hook means connected with said tail section.

2. A generally concavo-convex shaped fishing lure of the wobble spoon type having a central body section, a forward head section, and a rearward tail section, said central body section being abruptly offset from both the head and tail sections along sharply defined offset lines, with the several sections having different lateral V-shaped configurations varying from a relatively flat angled V in the head section to a flatter angled V in the body section, to a relatively sharp angled V in the tail section, with the apexes of said sections together forming a valley line extending lengthwise of the lure, with the lines of offset at each location of offset diverging rearwardly from a point of intersection with said valley line outwardly to the edges of the lure, with line connection means provided in said head portion, and with hook means connected with said tail portion.

3. A fishing lure in accordance with claim 2, wherein the amount of offset at each location of offset progressively increases from the longitudinally extending valley line outwardly toward the edges of the lure.

4. A fishing lure in accordance with claim 3, wherein the offset at the edge of the spoon at each location of offset is approximately three times the offset at the valley.

5. A generally concavo-convex shaped fishing lure of the wobble spoon type, representing the outline of a fish and normally disposed in the water with its concavo side up, said lure comprising a forward head section having a relatively flat V-shaped transverse cross-sectional configuration extending generally uniformly throughout substantially the full length of said head section, a central body section having a flatter V-shaped transverse cross-sectional configuration extending generally uniformly throughout substantially the full length of said body section, and a rearward tail section having a relatively sharp V-shaped transverse cross-sectional configuration extending generally uniformly throughout substantially the full length of said tail section, with said tail section being relatively narrower in width and shorter in length than said body section, with said body section being abruptly offset below both said head and tail sections along sharply defined offset lines, with the apexes of said sections together forming a longitudinally extending valley line, with said head, body and tail sections each being slightly curved longitudinally, and with the head section, body section and tail section parts of said valley line representing offset, concentrically extending curves.

6. A fishing lure in accordance with claim 5, wherein the transverse configuration of the head section involves head faces disposed on opposite side of the head portion of said valley line and defining between them a relatively flat obtuse angle falling within the range of angles extending from 145° to 155°, inclusive, the transverse configuration of the body section includes body halves disposed on opposite side of the body portion of the valley line and defining between them an extremely flat obtuse angle falling within the range of angles extending from 160° to 170°, inclusive, and the transverse configuration of the tail section includes tail side surfaces extending outwardly on opposite sides from the tail portion of the valley line and defining between them a relatively sharp obtuse angle falling within the range of angles extending from 110° to 125°, inclusive.

References Cited in the file of this patent

UNITED STATES PATENTS

| | | | |
|---|---|---|---|
| 1,169,683 | Sebenius | Jan. 25, | 1916 |
| 1,589,860 | Pealer | June 22, | 1926 |
| 1,683,890 | Heitmiller | Sept. 11, | 1928 |
| 1,854,028 | Gruenhagen | Apr. 12, | 1932 |
| 2,053,954 | Marsh | Sept. 8, | 1936 |
| 2,254,981 | Sisco | Sept. 2, | 1941 |
| 2,264,211 | La Chance | Nov. 25, | 1941 |
| 2,706,868 | Le Blanc | Apr. 26, | 1955 |
| 2,787,860 | Carr | Apr. 9, | 1957 |